United States Patent [19]

Murphy

[11] 4,143,098
[45] Mar. 6, 1979

[54] CDB RUBBER MODIFIED THERMOPLASTICS

[75] Inventor: Raymond F. Murphy, Whippany, N.J.

[73] Assignee: Exxon Research & Engineering Co., Florham Park, N.J.

[21] Appl. No.: 668,083

[22] Filed: Mar. 18, 1976

[51] Int. Cl.² ............................................... C08L 9/00
[52] U.S. Cl. ................................. 260/888; 260/890; 260/892; 260/893
[58] Field of Search .................. 260/888; 526/20, 47

[56] References Cited

U.S. PATENT DOCUMENTS

| | | | |
|---|---|---|---|
| 2,557,642 | 6/1951 | Dudley | 260/888 |
| 2,910,450 | 11/1959 | Popielski | 260/888 |
| 3,816,371 | 6/1974 | Baldwin et al. | 526/47 |
| 3,968,185 | 7/1976 | Baldwin et al. | 260/879 |

*Primary Examiner*—J. Ziegler
*Attorney, Agent, or Firm*—John J. Mahon; Harvey L. Cohen

[57] ABSTRACT

High impact strength rubber modified styrene and styrene-acrylonitrile (SAN) thermoplastics are prepared by incorporating into the styrene or SAN copolymer a conjugated diene butyl rubber elastomer. Conventional processes are effective to provide products having suitable impact strength and related properties.

9 Claims, No Drawings

CDB RUBBER MODIFIED THERMOPLASTICS

BACKGROUND OF THE INVENTION

This invention relates to rubber modified styrene polymers. More particularly this invention relates to the use of conjugated diene butyl rubber elastomers as novel rubber modifiers for preparing high impact strength styrene and styrene-acrylonitrile copolymer based thermoplastic resins.

Impact resistant rubber modified polystyrene and styrene-acrylonitrile (hereafter SAN) copolymers are well known in the art and are commercially available. In such products, polybutadiene rubber or styrene butadiene rubber are used almost exclusively as the elastomeric modifiers at levels of rubber content of about 3 to 15% by weight but some materials containing up to about 30% elastomers are also available.

In both rubber modified polystyrene and rubber modified SAN polymers, the latter being generally known as the ABS resins, the elastomeric component is dispersed into the styrene or SAN copolymer, the system being two-phase in nature.

These materials are conventionally prepared by the mass, mass suspension or emulsion polymerization processes. In the mass and mass suspension processes the rubber polymer is dissolved in styrene monomer and the monomer is then polymerized. The mass suspension process uses a dispersion of the polymers in water in the final stages of the polymerization. In the emulsion polymerization technique monomer and rubber latices are combined and the monomer is graft polymerized, this method usually being employed with rubber modification of styrene-acrylonitrile thermoplastics. Low unsaturation rubbers such as butyl rubber and EPDM (as defined in ASTM D-1418-72A) have been found generally ineffective as impact strength modifiers for styrene and SAN polymers, a sufficient degree of grafting and rubber crosslinking not being achieved. The present invention is based on the discovery that conjugated diene butyl rubber elastomers exhibit high reactivity and may be successfully incorporated into styrene or SAN polymers using conventional processes to prepare products having good impact strength properties.

In accordance with the present invention, there have been discovered elastomer modified polystyrene or SAN thermoplastics, the elastomer being a conjugated diene elastomer copolymer consisting of from 85 to 99.5% by weight of a $C_4$-$C_7$ isoolefin combined with 15 to 0.5% by weight of a conjugated diolefin having 4 to 14 carbon atoms, the elastomer being further characterized as containing randomly distributed sites of conjugated diene unsaturation. A more specific embodiment comprises compositions wherein the conjugated diene elastomer is produced by dehydrohalogenating a halogenated isobutylene-isoprene butyl rubber to produce a copolymer having randomly inserted conjugated diene unsaturation in the isoprene units of said copolymer.

A further embodiment of the present invention constitutes blends of said CDB elastomers with chlorinated butyl rubber as suitable rubber modifiers for styrene or SAN thermoplastics. While chlorinated butyl rubber alone is not considered suitable, it has been found in accordance with the present invention that chlorinated butyl rubber may be employed in combination with the conjugated diene butyl rubber elastomers in blends containing 90% to 10% by weight of chlorinated butyl rubber. Such blends containing 60–80% by weight chlorinated butyl rubber and 40 to 20% by weight of CDB elastomer are particularly suitable.

The CDB rubber modified compositions of the present invention contain the elastomeric component in what are considered conventional amounts for high impact strength styrene or SAN plastics, that is, about 3 to 10% by weight, or more, such as up to about 15% for rubber modified SAN thermoplastics, of rubber modifier being present in the finished product. Higher concentrations such as up to about 30 or 40% may also be used if such formulations are desired. A particular advantage of the present invention is that no change in processing is required, the CDB or CDB-chlorinated butyl blends being adaptable to the usual methods for making impact resistant styrene or SAN polymers.

The compositions of the present invention meet the various structural and morphological requirements for the rubber phase in rubber modified styrene or SAN systems: a discrete rubber phase exists with particle size 1 to 10 microns, a graft layer of polymerized styrene or styrene-acrylonitrile is formed on the surface of the rubber particle and controlled crosslinking of the rubber modifier is present.

The compositions of this invention are prepared by conventional mass and emulsion polymerization techniques wherein the elastomer is graft polymerized with styrene or styrene-acrylonitrile. Both grafting and crosslinking are necessary in order to achieve the desired impact strength properties of the rubber modified plastic composition.

The conjugated diene butyl elastomeric copolymers useful in the present invention are known and are described in U.S. Pat. No. 3,816,371 issued June 11, 1974 to Baldwin et al., incorporated herein by reference.

These conjugated diene butyl elastomers may be generally described as copolymers consisting of from 85 to 99.5% by weight of a $C_4$-$C_7$ isoolefin combined with 15 to 0.5% by weight of a conjugated diolefin having 4 to 14 carbon atoms, the copolymer containing randomly distributed conjugated diene unsaturation. Moreover, as described in U.S. application Ser. No. 465,479 filed by Baldwin et al. on Apr. 30, 1974, the conjugated diene functionality may be present such that both olefin units are in the backbone chain, or both are outside of the chain, or one may be inside the chain and one outside, or both may be present in a ring, such as by dehydrohalogenation of allylic halogen of cyclopentadiene. Dehydrohalogenation of a butyl-type polymer prepared from dimethylbutadiene and isobutylene can provide conjugated olefinic structures having the following configurations:

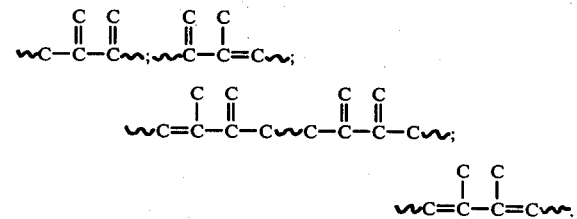

Preferably the copolymers useful in the present invention are copolymers of isobutylene and isoprene, a major portion of the isoprene units combined therein having conjugated diene unsaturation and may be represented by the following structure:

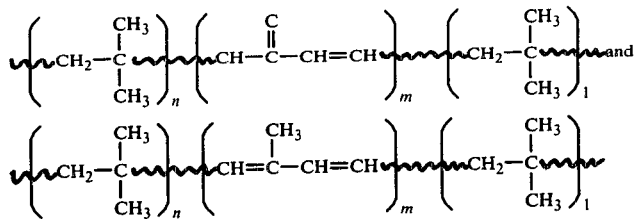

where n + m represent the number of isoolefin units incorporated into the butyl rubber polymer backbone and m represents the number of conjugated diolefin units present substantially as isolated units.

The preferred method of preparing the elastomers useful in the present invention is through dehydrohalogenation of a halogenated butyl rubber.

The term "butyl rubber" is used in the industry to describe copolymers made from a reaction mixture containing 70 to 99.5% by weight of a $C_4$-$C_7$ isoolefin such as isobutylene and 30 to 0.5% by weight of a $C_4$-$C_{14}$ conjugated multiolefin such as isoprene. The resulting copolymers contain 85 to 99.5% by weight of isoolefin and 0.5 to 15% of combined multiolefin. The polymer backbone of commercial butyl rubber consists primarily of isobutylene units with just a few percent of isoprene units, the latter contributing the small amount of unsaturation present in butyl rubber.

Halogenated butyl rubber, such as chlorinated butyl rubber, is described in U.S. Pat. No. 3,099,644 and is typified by the following formula (X being a halogen, chlorine or bromine):

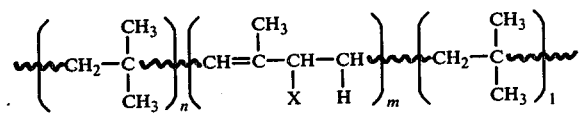

Halogenated butyl rubber may be prepared by halogenating butyl rubber in a solution containing 1 to 60% by weight butyl rubber in a substantially inert $C_5$-$C_8$ hydrocarbon solvent such as pentane, hexane, heptane and contacting the solution with halogen gas for about 2 to 25 minutes whereby halogenated copolymers form containing up to 1 or somewhat more halogen atom per double bond initially present. Illustrative is "Chlorobutyl 1068" a chlorinated butyl rubber (isobutylene-isoprene) which before halogenation contains about 1.8 mole % unsaturation and a viscosity average molecular weight of about 450,000. Chlorinated butyl rubber generally will contain about 0.5 to 3.0 wt. % of combined chlorine, preferably 1-2 wt. %.

The conjugated diene butyl elastomers useful in the present invention are preferably prepared via dehydrohalogenation of a halogenated butyl rubber. Generally this process comprises contacting a solution of halogenated butyl rubber with: (1) a soluble metal carboxylate where the metal is selected from the metal of Groups Ib, IIb, IVa and VIII of the Periodic Table; (2) a soluble carboxylic acid; and (3) an oxide or a hydroxide of the metal selected from Groups Ia and IIa of the Periodic Table. This dehydrohalogenation process is described in detail in U.S. Pat. No. 3,775,387 issued Nov. 27, 1973 to Baldwin et al. and is incorporated herein by reference.

The mole percent of conjugated diene (CD) unsaturation in the elastomers useful in the present invention may generally be described as being from about 0.5 to about 2.5 and these conjugated diene butyl elastomer copolymers have a number average molecular weight generally from about 5,000 to 500,000. While preferred levels of CD functionality are set forth hereinbelow, no absolute levels of CD functionality have been established since CDB reactivity in preparing the products of the present invention depends on not only the degree of conjugated diene functionality but also the structure of the elastomer with respect to the location of the conjugated unsaturation. As is recognized in the art, unsaturation predominantly outside the main polymer chain structures being shown hereinabove, gives products with a much greater degree of reactivity.

The styrene and SAN polymers useful in the present invention are well known in the art and only brief mention need be made thereof. Unmodified general purpose polystyrene is a high molecular weight ($Mw = 2$–$3 \times 10^5$) crystal clear thermoplastic having an Izod impact value of 0.2 ft.-lb./in. and a specific gravity of about 1.05. Unmodified SAN copolymers generally contain about 24% acrylonitrile and have Izod impact values of about 0.4 (Izod impact values reported herein were determined in accordance with ASTM D-256-73 on samples molded at 450° F.).

In the present invention it has further been found that the level of conjugated diene functionality in the elastomer can control the rubber phase particle size and the extent of grafting and crosslinking of the dispersed rubber phase when styrene is modified with a CDB elastomer using the mass process. The mole % of conjugated diene (CD) units is preferably less than about 1.1 mole % CD average. Such an elastomer can be obtained from a CDB prepared to contain 1.1% or less mole % conjugated diene, or by blending 3 parts by weight of a 0.66 mole % CD CDB elastomer and 1 part of a 1.3 mole % CD CDB elastomer, or by blending 3 parts of a chlorinated butyl rubber, such as a chlorinated isobutylene-isoprene copolymer, which contains no conjugated diene units, with 1 part of a 1.3 mole % CD CDB elastomer. The most desirable physical properties have been obtained with these blends and conjugated diene proportions. For optimum results, such as ease of adaptability of the CDB polymers to conventional processes, the minimum amount of conjugated diene functionality present should be about 0.7 mole %.

On the other hand, when SAN copolymers as opposed to styrene alone are modified with CDB latices in accordance with the present invention, a relatively greater mole % of conjugated diene functionality can be employed. In such materials, for example, the use of about 1.3 mole % conjugated diene CDB elastomers at levels of about 6 to 15% by weight based on the combined weight of elastomer and SAN gives products with desirable properties.

The invention is further illustrated by the following examples which are not to be considered as limitative of its scope. All blends reported are parts by weight, e.g., 3/1 means 3 parts blended with 1 part by weight. In the examples the following test procedures were used.

Izod Impact:
ASTM D-256-73, notched specimens $\frac{1}{2} \times \frac{1}{8} \times 5$ in., molded at 450° F.

Tensile Properties:
ASTM D-638-72, specimen $\frac{1}{4} \times \frac{1}{8} \times 1\frac{1}{4}$ in. (Type IV), 0.2 in./min. strain rate Melt Index:
ASTM D-1238-62T, 3 gram sample, Condition G. (Properties reported usually reflect a minimum of ten Izod specimens, three tensile specimens and three melt index measurements).

CDB elastomers used in the examples were conjugated diene isobutylene-isoprene copolymers prepared by dehydrohalogenation of chlorinated butyl rubber.

EXAMPLE 1

Utilizing the mass process, styrene solutions containing a total of 6% by weight of CDB rubber blends and 0.20% azo-bis-butylonitrile initiator (AIBN) were purged with nitrogen and heated at 75° C. for three hours in a stirred resin flask. During this pre-polymerization step, a two-phase system resulted with discrete styrene swollen rubber spheres dispersed in a styrene-polystyrene continuous phase. This two-phase solution was poured into a press mold and heated in a press at temperatures of from 75° C. to 140° C. for 5 hours. The resulting solid specimen was cut into small pieces and the remaining monomer was devolatilized at 200° C. for two hours in a vacuum oven. The material was then injection molded at 450° F. to form Izod impact and tensile specimens. The data is reported in Table I below. Blends of two CDB rubbers were used, one CDB containing 0.66 mole % conjugated diene (Mv = 436,000) the other containing 1.30 mole % conjugated diene (Mv = 455,000).

after extracting away all the free polystyrene with a 50/50 mixture of acetone/MEK.

$$\% \text{ gel} = \frac{\text{weight of the dispersed phase}}{\text{weight of the sample}} \times 100$$

(c) Crosslink density of the rubber phase increases with increasing conjugated diene content. Swelling index of the gel in toluene is inversely related to crosslink density.

$$\text{Swelling Index} = \frac{\text{weight of toluene swollen gel}}{\text{weight of dry gel}}$$

(d) High conjugated diene content CDB did not yield a dispersed rubber phase. Early crosslinking of the rubber phase during the prepoly step prevented phase inversion.

(e) The toughening capacity of the CDB rubber is related to its level of conjugated diene. Optimum results in this case being obtained with a 3/1 CDB (0.66)/CDB (1.33) rubber blend.

EXAMPLE 2

This example demonstrates that a favorable balance of important thermoplastic properties can be obtained using CDB rubber as an impact modifier for polystyrene. Styrene solutions containing 6% by weight of a 3/1 parts by weight rubber blend of CDB (0.66)/CDB (1.33) and 0.5% lauroyl peroxide were purged with nitrogen and heated at 75° C. for 3 hours in a stirred resin flask. During the prepolymerization step a two-phase system with discrete rubber particles resulted. The prepoly syrup was blended with 3% (compound E) and 5% (compound F) by weight of a paraffinic mineral oil (Tufflo 6056). The polymerization was continued for up to 19 hours at temperatures between 85° and 150° C. in a press mold. The resulting solid was cut into small pieces and the remaining monomer was devolatilized in a vacuum oven for two hours at 200° C. Izod impact

TABLE I

| Parts by Weight, Rubber Blends | % Rubber in Product | % Gel Active/MEK Extraction | Rubber Phase Swelling Index | RPs[4] (microns) | Izod Impact (ft/lbs/in) | Tensile at Break (psi) | Compound |
|---|---|---|---|---|---|---|---|
| 5/1 CDB (0.66)/ CDB (1.33)[1] | 6.6 | 7.79 | 32.8 | ~25 | 0.37 | 4638 | A |
| 4/1 CDB (0.66)/ CDB (1.33) | 6.3 | 8.59 | 25.7 | ~10 | 0.50 | 4830 | B |
| 3/1 CDB (0.66)/ CDB (1.33)[1] | 6.3 | 9.06 | 25.4 | ~5 | 0.64 | 4530 | C |
| 2/1 CDB (0.66)/ CDB (1.33) | 6.3 | 9.81 | 16.9 | <1 | 0.44 | 3810 | D |
| CDB (1.33) | 6 | (crosslinked in pre-poly-no phase inversion) | — | — | — | — | |
| "Styron 475"[2] | — | — | — | 1-5 | 0.94 | 4160 | |
| "Foster Grant 509D"[3] | — | — | — | — | 0.22 | 5520 | |

[1] CDB (0.66) is CDB having a conjugated diene content of 0.66 mole %; CDB (1.33) has a content of 1.33 mole %
[2] A commercially available polybutadiene modified styrene-thermoplastic, data included for comparison
[3] A commercially available unmodified crystal clear polystyrene, data included for comparison
[4] RPS is rubber particle size Several important features of the effect of conjugated diene level is illustrated in Table I.

(a) Rubber particle size (as measured by phase contrast microscopy on the prepoly syrups) decreases with increasing conjugated diene content of the elastomeric phase.

(b) The extent of rubber phase grafting increases with increasing conjugated diene content. Grafting is measured by the increase in dispersed phase (i.e. % gel)

and tensile specimens were obtained from injection molding at 450° F. Melt Index flow was measured according to ASTM D-1238-62T, condition G. The results are given below in Table II.

TABLE II

| | "Styron 475"[5] | E | F | "Foster Grant 474"[5] |
|---|---|---|---|---|
| Izod Impact | | | | |

TABLE III-continued

|  | "Styron 475"[5] | E | F | "Foster Grant 474"[5] |
|---|---|---|---|---|
| (ft.lbs/in. of notch) | 0.93 | 1.00 | 1.06 | 1.54 |
| Tensile at Yield (psi) | 4160 | 4420 | 4720 | 3640 |
| % Elongation at Yield | 41 | 20 | 17 | 34 |
| Melt Index | 5 | 2.8 | 2.9 | 3.1 |

[5] Commercially available polybutadiene modified polystyrene, thermoplastics data included for comparison

EXAMPLE 3

This example illustrates that blends of CDB and chlorinated butyl rubbers are useful in the present invention. Styrene solutions containing 10% by weight of a 3/1 parts by weight blend of "Chlorobutyl 1068"/CDB (1.3 mole %) and 0.175% AIBN were heated at 75° C. for 2½ hours in a stirred resin flask. The prepoly syrup was blended with 3% (compound G) and 5% (compound H) paraffinic mineral oil (Tufflo 6056) and the polymerization was finished in a press mold at 75° to 150° C. for 19½ hours total. After devolatilization of the remaining monomer, these materials gave the properties listed in Table III.

TABLE III

|  | G | H |
|---|---|---|
| % Rubber | 10.3 | 10.3 |
| Rubber Particle Size (microns) | ~2 | ~2 |
| Izod Impact (ft.lbs/in. of notch) | 1.03 | 1.03 |
| Tensile Strength at Yield (psi) | 4685 | 4568 |
| Melt Index (gms/10 min.) | 2.5 | 2.9 |

EXAMPLE 4

This example illustrates that a CDB elastomer of controlled conjugated diene level as well as blends of these elastomers will also give satisfactory high impact polystyrene products. The following materials were prepared under identical conditions:

Styrene solutions containing 6% by weight of a 3/1 rubber blend of CDB (0.66)/CDB (1.3) (compound I) or CDB (1.08 mole % of CD, Mv = 474,000) (compound J) with 0.15% AIBN were polymerized through phase inversion at 75° C. for 3 hours. The above syrups were further polymerized in a press mold at temperatures between 75° and 105° C. After monomer devolatilization these materials gave the properties listed in Table IV.

TABLE IV

| Rubber Formation | I 3/1 blend CDB (0.66)/CDB(1.3) | J 1.08 mole % CDB |
|---|---|---|
| % Rubber | 6.1 | 6.1 |
| % Gel | 13.8 | 15.3 |
| Swelling Index | 21.9 | 17.9 |
| Rubber Particle Size (microns) | ~3 | ~15 |
| Izod Impact (ft.lbs/in. of notch) | 0.63 | 0.78 |
| Tensile Strength at Yield | 6380 | 6010 |

EXAMPLE 5

In this example the use of a conjugated diene butyl rubber latex as the elastomeric component in a rubber modifier styrene-acrylonitrile copolymer is demonstrated. Comparative data is also presented showing that the use of a conventional butyl rubber latex in this process produces a product having inferior strength and impact properties.

TABLE V

| SAN Copolymer Latex |  |
|---|---|
| Reagents |  |
| deionized water | 300 gms |
| styrene | 70 gms |
| acrylonitrile | 30 gms |
| "Neofat 92-04"(fatty acid) | 3 gms |
| 10% KOH | 6 gms |
| t-dodecyl mercaptan | 0.35 gms |
| potassium persulfate | 0.30 gms |

The first six ingredients were heated to 50° C. in a rapidly stirred resin flask. The potassium persulfate initiator was then added and the reaction was continued for 4 hours at 50° C.

TABLE VI

| Preparation of CDB Latex |  |
|---|---|
| Reagents |  |
| CDB (1.3 mole % CD) | 65 gms |
| toluene | 585 gms |
| "Solwyte" tall oil rosin | 3.25 gms |
| deionized water | 650 gms |
| 10% KOH | 6.5 gms |

The CDB rubber was dissolved along with "Solwyte" rosin in toluene. The water and potassium hydroxide were then added to this solution and the mixture was dispersed on an Appenbach homogenizer. The pH of the resulting emulsion was adjusted to 11 with 10% KOH and the emulsion was redispersed. The toluene was then stripped off in a Rotoevaporator at 35° C. to give a latex at 39.6% solids content.

TABLE VII

| CDB-SAN Emulsion Graft |  |
|---|---|
| Reagents |  |
| deionized water | 200 gms |
| CDB latex | 85 gms |
| Styrene | 42 gms |
| Acrylonitrile | 24 gms |
| t-dodecyl mercaptan | 1 gm |
| potassium persulfate | 0.4 gms/100 ml H$_2$O |

The reagents were mixed with 50 ml of the potassium persulfate solution and heated in a stirred resin flask for 4 hours at 50° C. An additional 50 ml of the potassium persulfate solution was added and the resulting emulsion was heated an additional 3 hours at 50° C., then 1½ hours at 70° C.

TABLE VIII

| Butyl-SAN Emulsion Graft |  |
|---|---|
| Reagents |  |
| deionized water | 200 gms |
| EMD 601B Butyl Latex (54.3% solids) | 62 gms |
| Styrene | 42 gms |
| Acrylonitrile | 24 gms |
| t-dodecyl mercaptan | 1 gm |
| potassium persulfate | 0.4 gm/100 ml H$_2$O |

Procedure same as above.

LATEX BLENDING AND COAGULATION

The required amounts of the rubber-SAN emulsion graft latices of Tables VII and VIII were each blended with the SAN latex of Table V to the final rubber levels given in Table IX. These blended latices were poured into two liters of water acidified with 50 ml of 10% H₂SO₄. The resulting precipitate was filtered and washed twice with distilled water and dried overnight in a vacuum oven at 60° C. The polymer blends were then mill rolled at 450° F. for 5 minutes.

The SAN copolymer and the CDB and butyl modified SAN blends gave the properties shown in Table IX. Addition of the CDB emulsion graft increased the impact strength of the SAN, whereas addition of butyl emulsion graft decreased the impact strength. As expected, tensile strength decreased with addition of rubber but % elongation at fail increases with the CDB emulsion graft. This is a clear demonstration of CDB's ability to toughen a SAN plastic using a typical emulsion type process, where conventional butyl rubber does not work and even exhibits a reduced impact strength.

TABLE IX

|  | SAN Co-polymer | 6% CDB-SAN Blend | 13% CDB-SAN Blend | 20% Butyl-SAN Blend |
|---|---|---|---|---|
| Izod Impact (ft.lbs/in of notch) | 0.48 | 0.93 | 1.33 | 0.30 |
| Tensile Strength at Yield (psi) | 8070 | 5945 | 4995 | 5105 |
| % Elongation at Fail | 6.1 | 6.7 | 23.0 | 4.5 |

What is claimed is:

1. An impact resistant elastomer grafted styrene or styrene-acrylonitrile polymeric thermoplastic composition, the elastomer being a conjugated diene butyl copolymer consisting of 85 to 99.5% by weight of a $C_4$-$C_7$ isoolefin and 15 to 0.5% by weight of a conjugated $C_4$-$C_{14}$ diolefin, said copolymer having randomly distributed sites of conjugated diene unsaturation.

2. The composition of claim 1 wherein the thermoplastic is polystyrene.

3. The composition of claim 1 wherein the thermoplastic is a styrene-acrylonitrile copolymer.

4. The composition of claim 1 wherein the conjugated diene butyl copolymer contains up to about 1.1 mole % conjugated diene.

5. The composition of claim 1 wherein the quantity of elastomer is about 3 to 15% by weight based on the combined weight of elastomer and thermoplastic.

6. The composition of claim 1 wherein the conjugated diene butyl copolymer is prepared by dehydrohalogenation of halogenated butyl rubber.

7. The composition of claim 2 wherein the conjugated diene butyl copolymer is an isobutylene-isoprene copolymer.

8. The composition of claim 1 wherein the conjugated diene butyl copolymer contains at least 0.7 mole % conjugated diene functionality.

9. The composition of claim 3 wherein the conjugated diene butyl copolymer contains about 1.3 mole % conjugated diene and wherein the quantity of elastomer is about 6 to 15% by weight based on the combined weight of elastomer and thermoplastic.

* * * * *